H. P. GALE.
METAL PULLEY.
APPLICATION FILED MAY 14, 1909.
1,027,835.
Patented May 28, 1912.
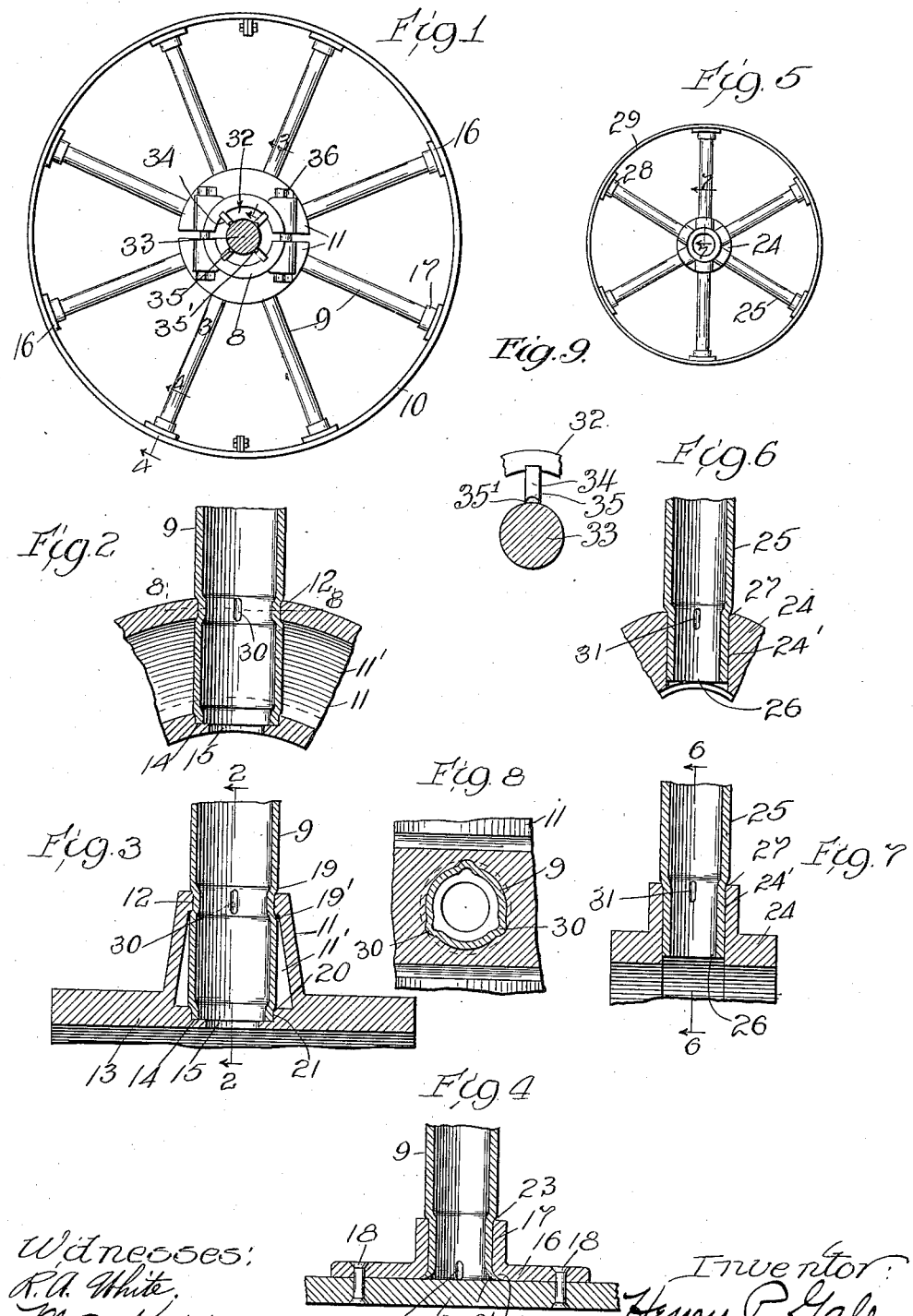

UNITED STATES PATENT OFFICE.

HENRY P. GALE, OF CHICAGO, ILLINOIS.

METAL PULLEY.

1,027,835.  Specification of Letters Patent.  Patented May 28, 1912.

Application filed May 14, 1909. Serial No. 496,011.

*To all whom it may concern:*

Be it known that I, HENRY P. GALE, a citizen of the United States, residing at Chicago, in the county of Cook and State of Illinois, have invented new and useful Improvements in Metal Pulleys, of which the following is a specification.

This invention relates to improvements in metal pulleys, and it can be embodied in pulleys with solid hubs or split hubs with equally satisfactory results.

The object of the invention is to provide a pulley of strong and substantial construction in which the parts are rigidly and securely connected so they will not work loose or twist in service, and which can be made inexpensively.

In the accompanying drawings Figure 1 is an elevation of a main shaft pulley embodying the invention. Fig. 2 is a detail sectional view on the line 2—2 of Fig. 3. Fig. 3 is a detail sectional view on the line 3—3 of Fig. 1. Fig. 4 is a detail sectional view on the line 4—4 of Fig. 1. Fig. 5 shows the invention embodied in a counter shaft pulley. Fig. 6 is a detail sectional view on the line 6—6 of Fig. 7. Fig. 7 is a detail sectional view on the line 7—7 of Fig. 5. Fig. 8 is a detail sectional view on the line 8—8 of Fig. 2. Fig. 9 is a detail enlarged view showing the locking key and the shaft.

Referring to the drawings and first particularly to the main shaft pulley embodiment of the invention illustrated in Figs. 1–4, 8 is the hub, 9 are the tubular spokes and 10 the rim of the pulley. The hub comprises a hollow annular boss 11 which has radial bores 12 to receive the spokes 9. The journal part 13 of the hub is bored in alinement with the bores 12 to form seats 14 to receive the inner end of the spokes, and openings 15 are provided for a purpose hereafter described.

The outer end of each spoke is seated in a plate 16, which has a socket 17 to receive the spoke, and is secured rigidly to the rim by rivets 18, or other suitable fastening means.

In practice the spokes are first secured in the hub, then the socket plates are mounted on the ends of the spokes, after which the rim is fastened to the socket plates. After a spoke is arranged in a bore of the hub and its end engaged with the seat 14 it is expanded to form shoulders 19 and 19' which engage the outer and inner edges, respectively, of the bore 12 in the boss, and a shoulder 20 which engages the outer edge 21 of the seat 14. The opening 15 enables the expanding tool to operate in the spoke within the boss to expand said spoke into the chamber 11' of the boss and form the annular shoulders 19, 19' and 20. After the spoke has been secured in locked engagement with the hub the socket plate is arranged on the outer end of the spoke and the latter is expanded to form a shoulder 23 to engage said plate at the inner edge of its socket 17. After all the spokes have been secured in the hub and provided with socket plates in this manner the rim is fastened in place as heretofore explained. The outer end 9' of each spoke is preferably expanded into the recess 16' formed at the bottom of the socket 17 in the plate 16 (Fig. 4).

In the counter shaft pulley illustrated in Figs. 5–7 the hub 24 is made solid and provided with radial bores 24' to receive the spokes 25. Openings 26 may be provided in the hub, if desired, to admit the expanding tool. The spokes are expanded to form annular shoulders 27 which engage the hub at the outer edges of the bores therein. Socket plates 28 are secured to the outer ends of the spokes by expanding the spokes therein and the rim 29 is fastened to the socket plates as heretofore described.

To prevent the spokes from twisting in the hub and socket plates I prefer to provide the edge of the bore 12 and the wall of the socket 17 in the plates 16 with one or more grooves 30 extending radially of the pulley and into which the spokes are expanded (Figs. 2–4). And I also prefer to provide similar grooves 31 in the wall of the sockets 24' in the hub 24 (Figs. 6, 7) for the same purpose. When the spoke is expanded into these grooves it will make locking engagement with the hub and socket plates and effectually prevent the spokes from twisting. This locking engagement also assists in securing the spokes against endwise movement in the hub and socket plate, and, in fact, against any movement of the spokes relative to the hub and socket plates. Instead of grooves 30 and 31 I may provide ribs for the same purpose. The bore 32 in the hub to receive the shaft 33 is larger in diameter than the diameter of the shaft and a plurality of locking keys 34 is interposed between the hub and shaft to fasten the pulley on the shaft.

The inner surface 35 of each key is curved to a shorter radius than the radius of the shaft so that the edges 35' will engage the shaft (Fig. 9). In assembling the parts the pulley is arranged on the shaft, the keys are inserted, and then the bolts 36, in the split hub (Fig. 1) are tightened to force the keys into locking engagement with the shaft. If the keys are used with a solid hub they may be driven endwise into place.

My invention is simple in construction, inexpensive to manufacture, and the parts are made and arranged to be readily assembled and rigidly and permanently secured together. The spokes are locked in the hub so that they will resist the strains to which metal pulleys are subjected and they are fastened to the rim in a manner which will prevent them from working loose in service.

What I claim and desire to secure by Letters Patent is:

1. A metal wheel comprising a hub provided with a hollow annular boss, a spoke located in said boss with one end thereof seated in a bore in the journal part of the hub, said spoke being provided with a shoulder engaging the edge of the journal part of the hub, and shoulders engaging the outer and inner edges of the boss, and a rim secured to the outer end of said spoke.

2. A metal pulley comprising a hub provided with a hollow annular boss bored to receive a spoke, a spoke engaged with said hub and having an enlarged portion providing shoulders for engagement with the journal part of the hub and the inner edge of the annular boss, and an enlarged portion extending beyond the boss and providing a shoulder for engagement with the outer edge of the boss.

3. A metal pulley comprising a hub having a hollow annular boss, said boss and the journal part of said hub being bored to receive a spoke, a spoke positioned in said bore and having an enlarged portion providing shoulders for engagement with the journal part of the hub and with the interior of the boss, and having an enlarged portion providing a shoulder for engagement with the exterior of the boss, and a rib and groove means to prevent the spoke from turning in the hub.

4. A metal pulley comprising a hub having a hollow annular boss, said boss and the journal part of said hub being bored to receive a plurality of spokes, spokes arranged in said bores, there being integral shoulders on the spokes for engagement with the journal part of the boss of the hub to prevent longitudinal movement of the spokes therein and ribs on the spokes to engage with the boss to prevent angular movement of the spokes relatively thereto, a plurality of plates fastened to said rim, each plate being provided with a socket and having an annular recess between the plate and the rim and an annular flange, there being a shoulder on each spoke adapted to engage with either end of the socket in the plate, whereby the rim is secured to the spokes.

HENRY P. GALE.

Witnesses:
WM. O. BELT,
M. A. KIDDIE.

---

Copies of this patent may be obtained for five cents each, by addressing the "Commissioner of Patents, Washington, D. C."